(12) United States Patent
Cunningham

(10) Patent No.: US 6,208,436 B1
(45) Date of Patent: *Mar. 27, 2001

(54) USE OF A HEADER PAGE TO PROVIDE SCAN CONTROL INFORMATION FOR A SCAN

(75) Inventor: Randy Mark Cunningham, Roseville, CA (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,486

(22) Filed: Feb. 9, 1998

(51) Int. Cl.$^7$ .................................................. H04N 1/04
(52) U.S. Cl. ............................................. 358/474; 358/505
(58) Field of Search ................................... 358/474, 450, 358/451, 453, 468, 402, 407, 444, 435, 440, 448, 403, 482

(56) References Cited

U.S. PATENT DOCUMENTS

| | | | |
|---|---|---|---|
| 4,086,443 | * | 4/1978 | Gorham et al. ................... 358/435 |
| 4,205,780 | * | 6/1980 | Burns et al. ...................... 235/454 |
| 4,760,606 | | 7/1988 | Lesnick et al. ..................... 382/61 |
| 5,126,858 | * | 6/1992 | Kurogane et al. ................. 358/450 |
| 5,129,016 | * | 7/1992 | Murakami et al. .................. 382/61 |
| 5,321,624 | * | 6/1994 | Helffrich et al. .................. 364/476 |
| 5,438,433 | * | 8/1995 | Reifman et al. ................... 358/468 |
| 5,465,167 | * | 11/1995 | Cooper et al. .................... 358/468 |
| 5,513,013 | * | 4/1996 | Kuo ................................. 358/448 |
| 5,519,507 | * | 5/1996 | Subramaniam et al. ............ 358/402 |
| 5,754,308 | * | 5/1998 | Lopresti et al. .................... 358/403 |
| 5,794,099 | * | 8/1998 | Sheldon et al. ..................... 399/82 |
| 5,798,845 | * | 8/1998 | Baek et al. ........................ 358/434 |

FOREIGN PATENT DOCUMENTS

596724 A1   5/1994   (EP).

OTHER PUBLICATIONS

HP ScanJet 4Si Scanner User's Guide, 1995, available from Hewlett–Packard Company as Manual Part No. C1301–90905, pp. 3–1 through 3–12.

HP ScanJet 4Si Scanner Administrator's Guide, 1995, available from Hewlett–Packard Company a Manual Part No. C130–90900, pp. i., 1, 2–7, and 2–8.

NetScan, available from Kofax as Part No. (P/N) 16600058 Rev. A, is the text from a pull–out tab that is mounted under the front edge of a NetScan scanner available from Kofax. Kofax's NetScan is an unpublished competitive analysis document prepared for internal use by Hewlett Packard Company in Jan. 1997.

\* cited by examiner

Primary Examiner—Jerome Grant, II
Assistant Examiner—King Y. Poon

(57) ABSTRACT

A document is optically scanned. A header page of the document is scanned and scan control information is extracted from the header page. The remaining pages of the document are then scanned into an image file. Upon completion of the scan, the image file is sent to a destination specified by the scan control information.

15 Claims, 7 Drawing Sheets

TRAILER PAGE ID SYMBOL: 
41

USER NAME  JOE SMITH 
42

SCAN IMAGE FILE NAME:  IMAGE.PCX 
43

DESTINATION DRIVE:  E:\ 
44

DESTINATION DIRECTORY:  IMAGES/JOE 
45

E-MAIL WHEN COMPLETE? (Y/N): NO 
47

PAGE COUNT:  23: 
48

40

USE OF A HEADER PAGE TO PROVIDE SCAN CONTROL INFORMATION FOR A SCAN

BACKGROUND

The present invention concerns optical scanners and pertains particularly to the use of a header page to provide scan control information for a scan.

Optical scanners allow images to be scanned into a computer system for modification and use. The most frequently employed method for controlling the acquisition and transfer of scanned images has been to attach a scanner via a SCSI cable interface to a dedicated personal computer. A software application running on the personal computer controls start/stop functions, the receiving of a scanned image, and the copying of a scanned image to the personal computer's hard drive.

When copying the scanned image to the hard drive, the software application controlling the scan uses the filename and directory specified by the user through the keyboard/mouse/monitor interface. The option of sending the scanned image to a remote destination on the computer network incorporates a separate second operation whereby the user copies or sends the image to the final destination using the personal computer and a network interface card for the personal computer.

One problem with using a scanner attached to a dedicated personal computer is that only one user at a time can enter scan control data into the dedicated personal computer. Productivity thus can be adversely affected because all users of the scanner are required to enter scan control information through the same interface on the dedicated personal computer attached to the scanner. Entering scan control information in this case is a serial process and users ultimately find themselves making return trips to the scanner's dedicated personal computer to check for an open opportunity to use the personal computer when no one else is using it.

Additionally, this solution has the disadvantage of requiring a second separate, manual, time consuming operation to send the scanned image out to the final remote network destination. The user must take the time to enter the commands for a personal computer software application to send the scanned image through the personal computer's network interface card onto the computer network and to its final destination.

Another solution/concept for directing network scanned images includes a system administrator sending a command from scanner software utility, running on a local personal computer, to a networked attached scanner to make the scanner aware that a particular user is now an approved/configured user. The user can then request scan job services from the network attached scanner through the use of a pre-assigned "user identification number." The system administrator also configures "destination identification numbers" to be used by the user in directing the final destination of a scan image file.

To perform a scan, the user physically goes to the scanner and selects/enables a job request by entering the user identification number and password (if required). The user enters the user identification number using an integrated keypad and alphanumeric display. The user utilizes multiple buttons to enter the user identification information, and destination identification information.

The user then places the page(s) on the scanner and activates the "START SCAN" command by pressing a button. The user retrieves the scanned page(s) from the scanner bed or output tray after the scan job is completed. Typically, only one scan job can be loaded into a scanner's automatic document feeder at a time when using this type of networked scanner configuration.

A third solution for directing network scanned images consists of a small control box that attaches to both the scanner and the computer network. The control box attaches to the scanner using an interface cable supporting either Centronics parallel or SCSI standards. The control box contains a user interface with both a keypad and alphanumeric display. In a similar way as described above a personal computer based software application is used to configure/setup the scanner control box.

One disadvantage to the solutions described above for directing network scanned images is that commands entered at the scanner keypad to define a new destination addresses are hard to learn and difficult to remember. Additionally, it takes time to enter the commands into the scanner.

Further, there can be a lack of ease of use. For example, if a user requires a new destination for the scan image, this requires the user to "navigate" and/or "find" commands contained inside the scanner on menus on a small alphanumeric display panel of the scanner. The keys used to access the scanner control menus often contain confusing dual functionality noted by multiple names on each key. These multi-function buttons and hidden menu commands, while often useful to experienced computer users, can intimidate novice users who are required to utilize multiple key strokes, menus, and associated nested menus and commands to enter a new scan image file destination.

Further, waiting at a networked scanner for an "in progress scan job" to finish is non-productive and frustrating for users. That is, in existing scanner systems, users cannot add a new scan job to an automatic document feeder (ADF) until a current scan job has been completed. This is true because otherwise there is no assurance that some or all of the new scan job will not be pulled in and accidentally added to the scan job that is currently in progress. In light of this concern the user is forced to choose between two inconvenient options: either wait for the current job to finish; or leave and come back later to try again.

Further, in prior art scanner systems, scanner configuration can be accidentally altered by a user. That is, as a user is operating the menu buttons on a network scanner, as described above, the user may accidentally change configuration settings that setup the scanner for network use. This type of mishap could cause downtime for both the current user as well as other users. As a result the system administrator may experience an increase in the support required.

Another disadvantage of all the above solutions is that a user cannot easily review and verify the scan instructions. For a dedicated personal computer the instructions are last seen on the personal computer monitor as the scan utility displays the information prior to sending the instructions to the scanner. To review all the scan instructions on a small scanner display is both awkward and time consuming.

In the case where an administrator has programmed the scanner or a control box is used, a user cannot easily look at the scan instructions generated in order to review or verify the scan status and/or accuracy.

SUMMARY OF THE INVENTION

In accordance with the preferred embodiment of the present invention, a document is optically scanned. A header page of the document is scanned and scan control information is extracted from the header page. The remaining pages of the document are then scanned into an image file. Upon completion of the scan, the image file is sent to a destination specified by the scan control information.

For example, the scan control information includes a user name, a file name for the image file and the destination. The scan control information can also include a page count for the document.

The scan control information can optionally specify that a trailer page is present. When a trailer page is specified as being present, upon detecting the trailer page, a check is made to see if the number of pages scanned for the document corresponds with the page count. When the number of pages scanned for the document does not correspond with the page count, an error message is sent to the destination. Also, when the number of pages scanned for the document does not correspond with the page count, the image file is not sent to the destination specified by the scan control information.

In the preferred embodiment, the scan control information is extracted using a bar code reader. Alternatively, the scan control information may be extracted from the scanned header, for example, using optical symbol or character recognition capability.

In the preferred embodiment, the header page is generated using a scanner utility. The scan control information is generally paired with text comprehensible by a user.

The present invention provides an easy to learn, easy to use, reliable method for multiple users to share a networked peripheral device that provides image scanning functionality. Specifically the present invention provides a way for a user to communicate image acquisition control commands to a peripheral device that provides image scanning functionality.

The header directed scan methodology of the present inventions offers a more convenient user interface than scanner integrated keypad and display.

The header directed scan methodology affords the user a more productive user interface to communicate instructions to the scanner through header and trailer pages. The more productive interface of typical computer used to generate header and trailer pages includes a keyboard, mouse and full size monitor. The first advantage of using a standard personal computer interface arise through the user's familiarity with that interface. In addition, the size of the keyboard and monitor as well as the additional component of a mouse are factors that make it easier to enter the scan control data than using the small keypad and display of a typical scanner. From a convenience perspective, the present invention gives users the advantage of being able to assemble and record scan control data at a desk rather that having to write it down and then stand at a scanner entering the information through an integrated keypad and display.

The header directed scan methodology of the present invention also allows for users to share a networked scanner more conveniently than prior art scan methods that allow only one scan job at a time to be loaded into the input tray. The present invention allows a user to conveniently add a scan job on top of other scan jobs that are already cued up in an input tray of an automatic document feeder (ADF) of a scanner. With the header and trailer pages separating the scan jobs a user can have high confidence that a scan document will not be accidentally appended to the prior scan job. The ability to load multiple scan jobs into an ADF improves users productivity by eliminating the need for a user to walk back to the scanner to check an see if another user has finished using the scanner.

The scan header page methodology of the present invention also eliminates the need for a user to push buttons on the scanner and reduces the chance of the scanner configuration being accidentally altered. When a novice user is required to interact with menu driven keypad/display interface there is a chance that the novice user may not recall the exact series of commands associated with the scanner. In this event the novice user may "explore" and attempt to find the menus and commands that look familiar. During this exploration the user may accidentally enter a configuration menu that has the potential to alter the scanner setup and prevent the scan job from being processed. In the event of this type of accident the productivity of other users requesting scan job services can be adversely affected.

Use of a scan header page allows a user to review the scan control information that was selected for a scan job. This allows the user to confirm the accuracy of the detailed scan control information on the header page just prior to placing the scan job into the scanner's ADF. Having a hard copy page allows for the review to be performed quickly and easily. In the event a scan job was performed at an earlier time or date, the user can reference the header page for the scan control information to recall information such as which file name was specified or what was the destination for the scan job.

Additionally, the header directed scan methodology of the present invention allows for multiple users to assemble and record scan control data at the same time on their own personal computers. When operations can be done simultaneously productivity is increased. Each user who is planning to request scan services may assemble and document specific scan control data simultaneously on his or her own personal computer. This avoids the inefficiencies which occur in the prior art when users have to wait for a current user to finish using a dedicated personal computer/scanner combination. Such a dedicated personal computer/scanner combination imposes an inefficient serial process methodology where users must take turns entering their scan control data.

The header directed scan methodology of the present invention also eliminates the need for a separate copy operation where the user would normally have to perform either to send a copy of the scanned image file over the network to finally have the image on a desired disk drive, or to copy the file onto portable media.

The header directed scan methodology of the present invention also eliminates the chance that repeated trips to the scanner will be required to find it without a user working with the equipment. With the header directed scan methodology the user only needs to place a scan job with header page (and trailer page if specified) into the automatic document feeder. This ease of use methodology improves productivity.

DESCRIPTION OF THE PREFERRED EMBODIMENT

Figure 1:
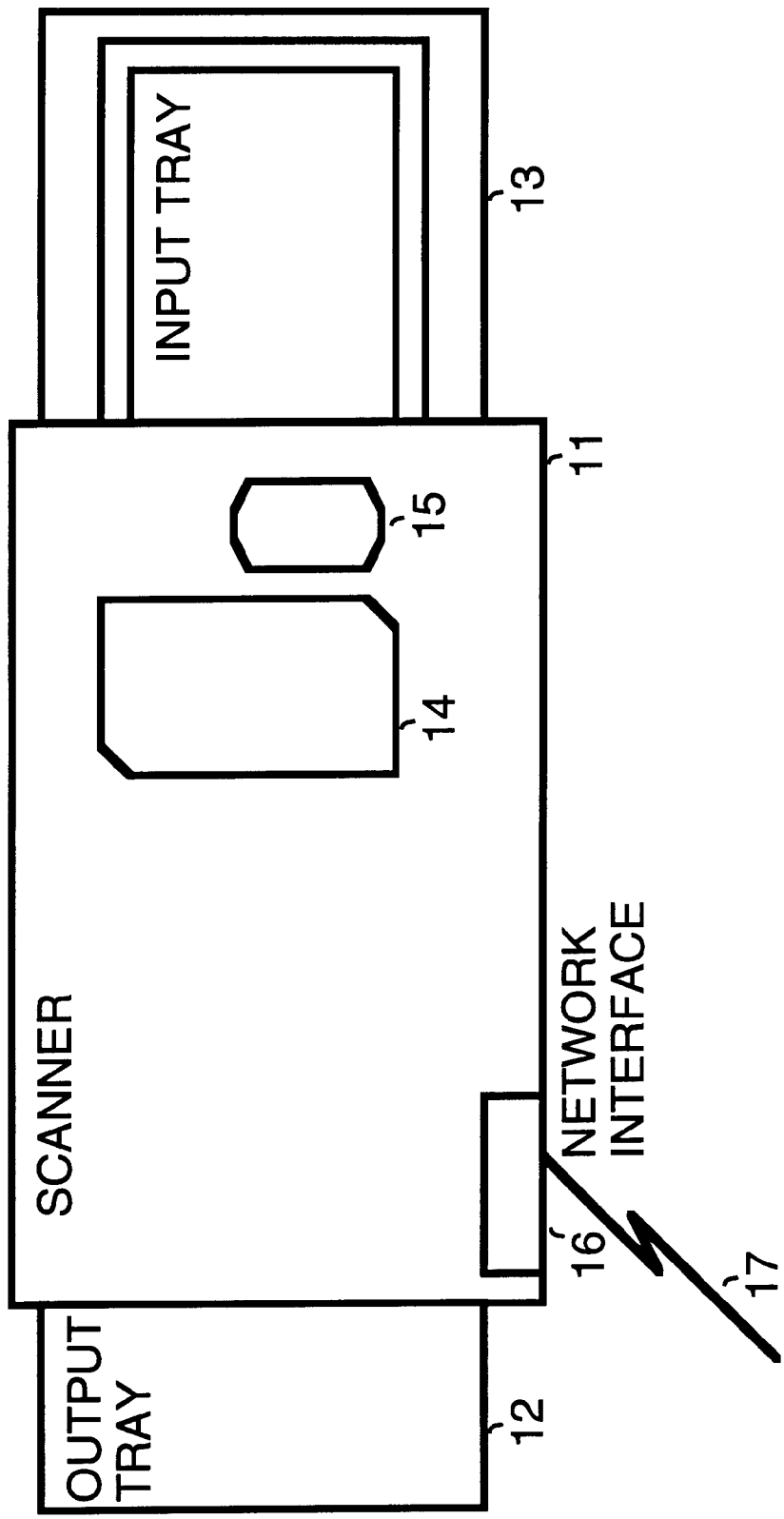
FIG. 1 is a top view of a scanner which utilizes optical symbol recognition hardware to control scans in accordance with a preferred embodiment of the present invention.

FIG. 1 is a top view of a scanner 11 which utilizes optical symbol recognition hardware 15 to control scans. Documents to be scanned are placed on input tray 13, which is an automatic document feeder (ADF). Image scanning device hardware 14 is used to perform the normal scanning function as paper is passed through scanner 11. Scanned pages are collected by an output tray 12. Network interface hardware 16 is used to transfer scanned information through a network 17 to a destination computing system.

For example, optical symbol recognition hardware 15 is a bar code symbol reader to read scan control information located on header and trailer pages of scan jobs.

Figure 2:
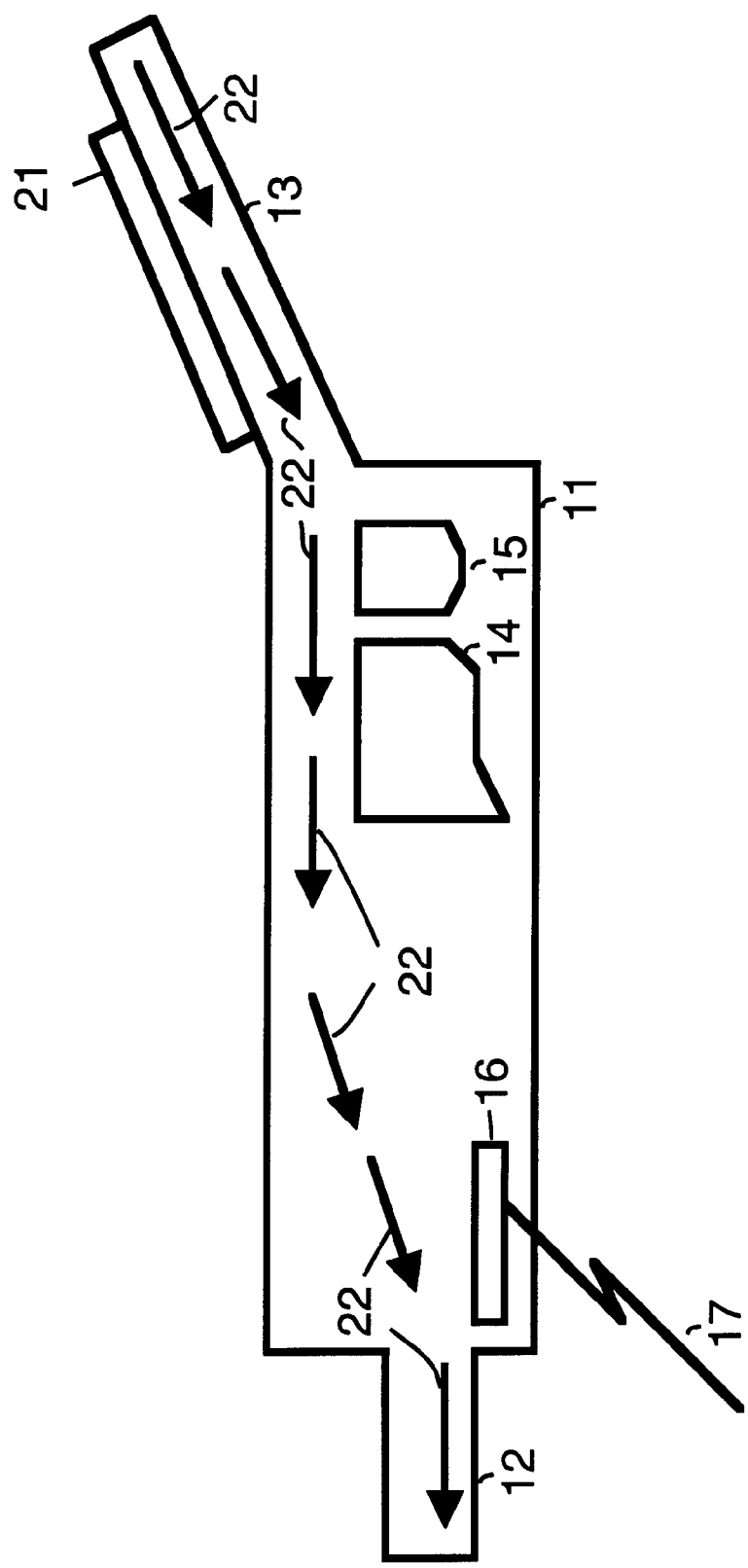
FIG. 2 is a side view of the scanner, shown in FIG. 1, which utilizes optical symbol recognition hardware to control scans in accordance with a preferred embodiment of the present invention.

FIG. 2 is a side view of scanner 11. Arrows 22 illustrate the paper path for documents 21 placed on input tray 13, which is an automatic document feeder (ADF). Each sheet of a scanned document passes over optical symbol recognition hardware 15 which recognizes symbols used to control scans. After passing over optical symbol recognition hardware 15, each sheet passes over image scanning device hardware 14, which performs the normal scanning function, and is collected by output tray 12.

While FIG. 1 and FIG. 2 show the preferred embodiment combination of image scanning peripheral and symbol recognition hardware, alternate combinations of symbols and corresponding symbol recognition hardware, can be used to read the scan control information located on the header and the trailer pages. For example, in another embodiment of the invention the optical symbol recognition hardware 15 can be replaced by a software program that analyzes the shape of symbols in the image scanned by image scanning device hardware 14. The software program uses, for example, optical character recognition, or other symbol recognition functionality to extract from a scanned image, scan control commands.

Network interface hardware 16 accesses network 17. Network interface hardware 16 is implemented, for example, as an internal network interface card, an external network interface box, or an attached PC with a network interface card. Network interface hardware 16 allows scanner 11 to automatically send the scanned image file to a specified final network destination.

Figure 3:
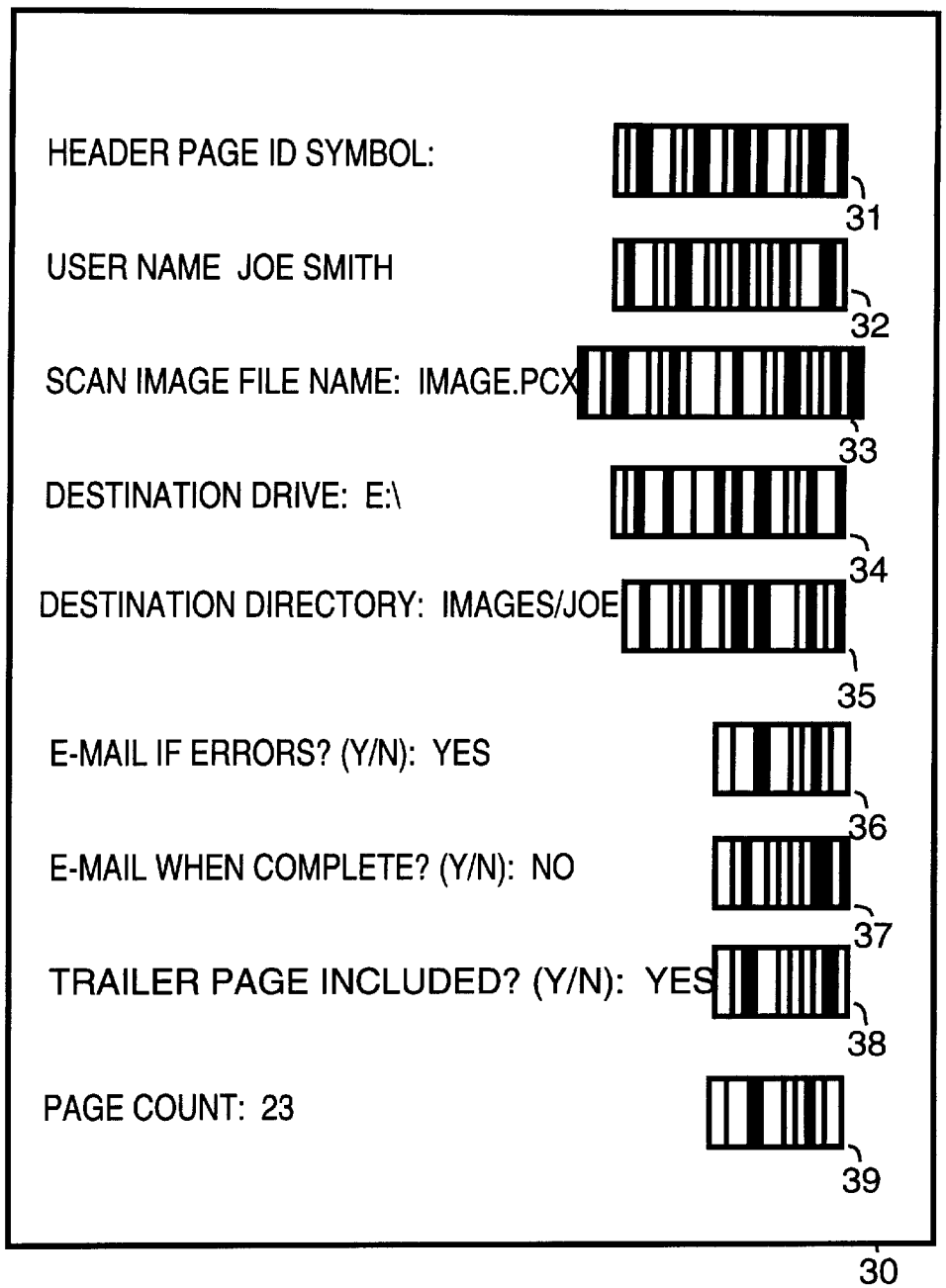
FIG. 3 shows an example of a header page used to control scans performed by the scanner shown in FIG. 1 and FIG. 2 in accordance with a preferred embodiment of the present invention.

FIG. 3 shows an example of a header page 30 used to control scans performed by scanner 11. Along a portion of header page 30 which will pass over optical symbol recognition hardware 15 (e.g., the right hand side of page 30), pre-defined scan control codes provide information to scanner 11 about the scan to be performed.

For example, the pre-defined scan control information on header page 30 which provides information to scanner 11 includes a header page identification scan control code 31, a user name scan control code 32, a scan image file name scan control code 33, a destination drive scan control code 34, a destination directory scan control code 35, an e-mail error (Y/N) notification indication scan control code 36, an e-mail completion (Y/N) notification indication scan control code 37, a trailer page present (Y/N) indication scan control code 38 and a page count 39. Other scan control codes may be placed on header page 30 to provide additional information to scanner 11. In some cases a user may decide to omit the page count and only use the trailer page to indicate the end of the scan document. In this case, when sending a notification of scan done, scanner 11 optionally indicates to user the number of pages scanned.

The user name scan control code 32 provides the user name. The scan image file name scan control code 33 provides the name of the file into which the scanned image will be placed. Destination drive scan control code 34, and the destination directory scan control code 35 indicate where the scanned image file is to be sent. Alternatively, an e-mail address scan control code can be used to indicate a e-mail address where the scanned image file can be sent. E-mail error (Y/N) notification indication scan control code 36 indicates whether the user should be e-mailed when an error occurs. E-mail completion (Y/N) notification indication scan control code 37 indicates whether the user should be e-mailed when the scan is complete. Trailer page present (Y/N) indication scan control code 38 indicates whether a trailer page is to be used. Page count 37 indicates the number of pages within the document to be scanned.

Additional scan control commands can be used, for example, to indicate the date, the priority level of the scan, the security level, the scan quality/resolution requested, whether the scan is to be black and white, gray scale or color, whether the scan is to be performed on a dual sided document, whether a scan confirmation email message is requested, and the scan page count. Additionally, other scan control commands can be used.

The scan control information can be encoded, for example, using bar code symbols which are read by optical symbol recognition hardware 15 of scanner 11. Alternatively, the scan control information can be composed of any other type of symbols or characters which can be recognized by scanner 11.

As shown in FIG. 3, each pre-defined scan control code is paired with a written explanation of the scan control code. The written explanation is optional, but is generally provided for ease of confirmation by a user.

Figure 4:
FIG. 4 shows an example of a trailer page used to indicate the end of a scan performed by the scanner shown in FIG. 1 and FIG. 2 in accordance with a preferred embodiment of the present invention.
Figure 4:
Figure 4:
Figure 4:
Figure 4:
Figure 4:
Figure 4:

FIG. 4 shows an example of a trailer page 40 which, optionally, may be used to indicate the end of a scan. Along a portion of trailer page 40 which will pass over optical symbol recognition hardware 15 (e.g., the right hand side of page 40), optical symbols provide information which indicates to scanner 11 that a scan has been completed.

An end scan symbol 41 on trailer page 40 indicates to scanner 11 that a scan has been completed. The end scan symbol 41 is, for example, a bar code symbol. Alternatively, end scan symbol 41 is composed of any other type of symbols or characters which can be recognized by scanner 11.

Optionally other information can be provided on trailer page 40 to confirm information to scanner 11 about the scan performed. This option confirmation information can include, for example, a user name 42, a scan image file name 43, a destination drive 44, a destination directory 45, an e-mail completion (Y/N) notification indication 47 and a page count 48. This optional scan control information can be composed of bar code symbols or any other type of symbols or characters which can be recognized by scanner 11.

As shown in FIG. 4, to the left of each symbol is a written explanation of the symbol. The written explanation is optional, but is generally provided for ease of confirmation by a user.

Directing scanner 11 via header page 30 provides an easy to learn, easy to use, reliable method for multiple users to share a networked peripheral device that provides image scanning functionality. The user, via header page 30, communicates image acquisition control commands to scanner 11. Scanner 11 can be any peripheral device that provides image scanning functionality.

During a scan, scanner 11 pulls in the first page of the scan, which is header page 30. Scanner 11 interprets the contents of header page 11 as control commands to be used by scanner 11.

An end of scan job delineation is provided by trailer page 40. In additionally, or in the alternative, the number of pages for the scan job can be indicated on header page 30.

With the control commands on header page 30, scanner 11 (or any scan capable peripheral) will process the pages of the scan job, manipulate scanned image as instructed, and then send the file containing the scanned image over computer network 17 to a specified destination.

The final destination of a scanned image, indicated by destination drive symbol 34 and destination directory 45, can be a networked hard drive, a file server, a FAX server, or the hard drive located inside a desktop personal computer. Alternatively, symbols on header page 30 can indicate an e-mail address, software application or printer which will serve as the final destination of a scanned image.

Figure 5:
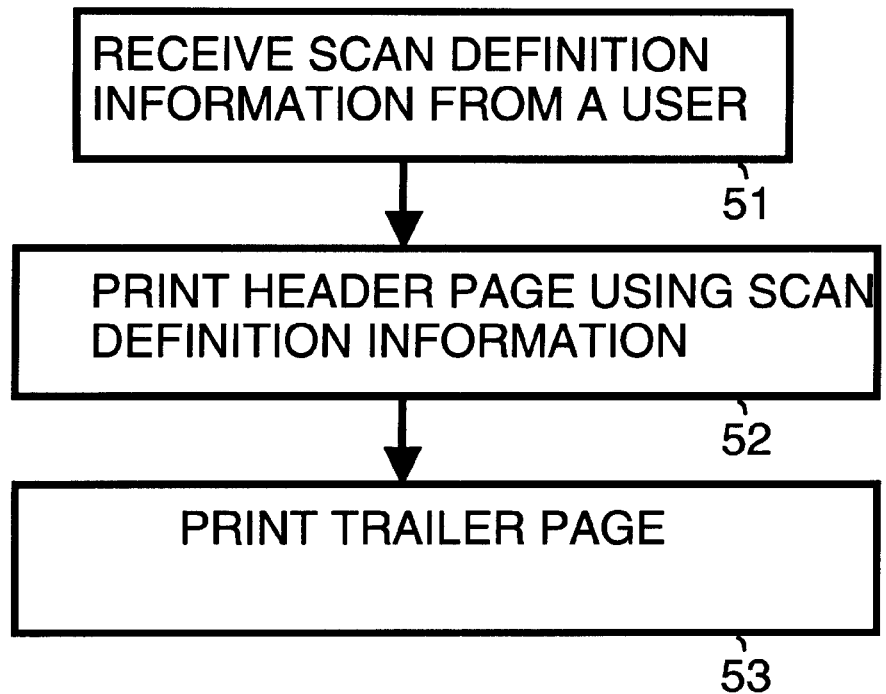
FIG. 5 shows a simplified flowchart which illustrates functionality of a scanner utility which generates a header page and a trailer page for the scanner shown in FIG. 1 and FIG. 2 in accordance with a preferred embodiment of the present invention.

FIG. 5 is a simplified flowchart which illustrates functionality of a scanner utility which generates header page 30 and trailer page 40 for scanner 11. In the preferred embodiment, the scanner utility is implemented in software and runs on a computer that has access to a printer. In a step 51, scan definition information is received from a user. The scan definition information includes, for example, the user's name, the file name for the scanned image destination system/directory where scanner 11 is to send the scanned image file, the date, number of pages for the job, the priority level, the security level, the scan quality/resolution requested, whether the scan is to be black and white, gray scale or color, an indication as to whether the scan is to be dual sided, an indication as to whether a scan confirmation e-mail message is requested, and an indication as to whether a trailer page is to be generate and used. A system administrator defines which of the above information is required and which is optional. Additional information also may be required or optional depending upon implementation.

In a step 52, the scan utility software prints a header page containing the information and commands in both human readable text and machine readable bar code symbols. If another system of symbols is used instead of bar codes, these symbols or characters are printed along with human readable text.

Additionally, in some embodiments of the present invention, a scan definition information option includes the scanner utility generating an encoded checksum on the header page to prevent the unauthorized cut/paste reuse of scan control commands that may be taken from a recycling box.

In a step 53, if instructed to do so, the scan utility generates optional "trailer" page 40 to allow scanner 11 to confirm the end of a scan job.

While in the preferred embodiment, optical symbol recognition hardware 15 is used to scan and interpret the commands, in alternate embodiments of the present invention, scan control information composed of symbols or characters can be scanned and decoded using image scanning device hardware 14 along with appropriate symbol or character recognition software.

When using the scanner utility, the user enters the relevant scan control information and then instructs the scan utility to print the header and the trailer pages containing the scan control information.

In one embodiment of the present invention, the scanner utility maximizes a users productivity by monitoring the status of available networked scanners and informing the user about scanners that are currently idle.

After the user has defined and printed scan header/trailer pages, the user places the document to be scanned into input tray 13 of scanner 11. The first page of the document is the header page created with the scanner utility. The last page is the trailer page, if utilized.

Because scanner 11 will recognize a header page, the user may "stack" a new job within input tray 13 on top of other jobs that are currently being processed by scanner 11.

Figure 6:
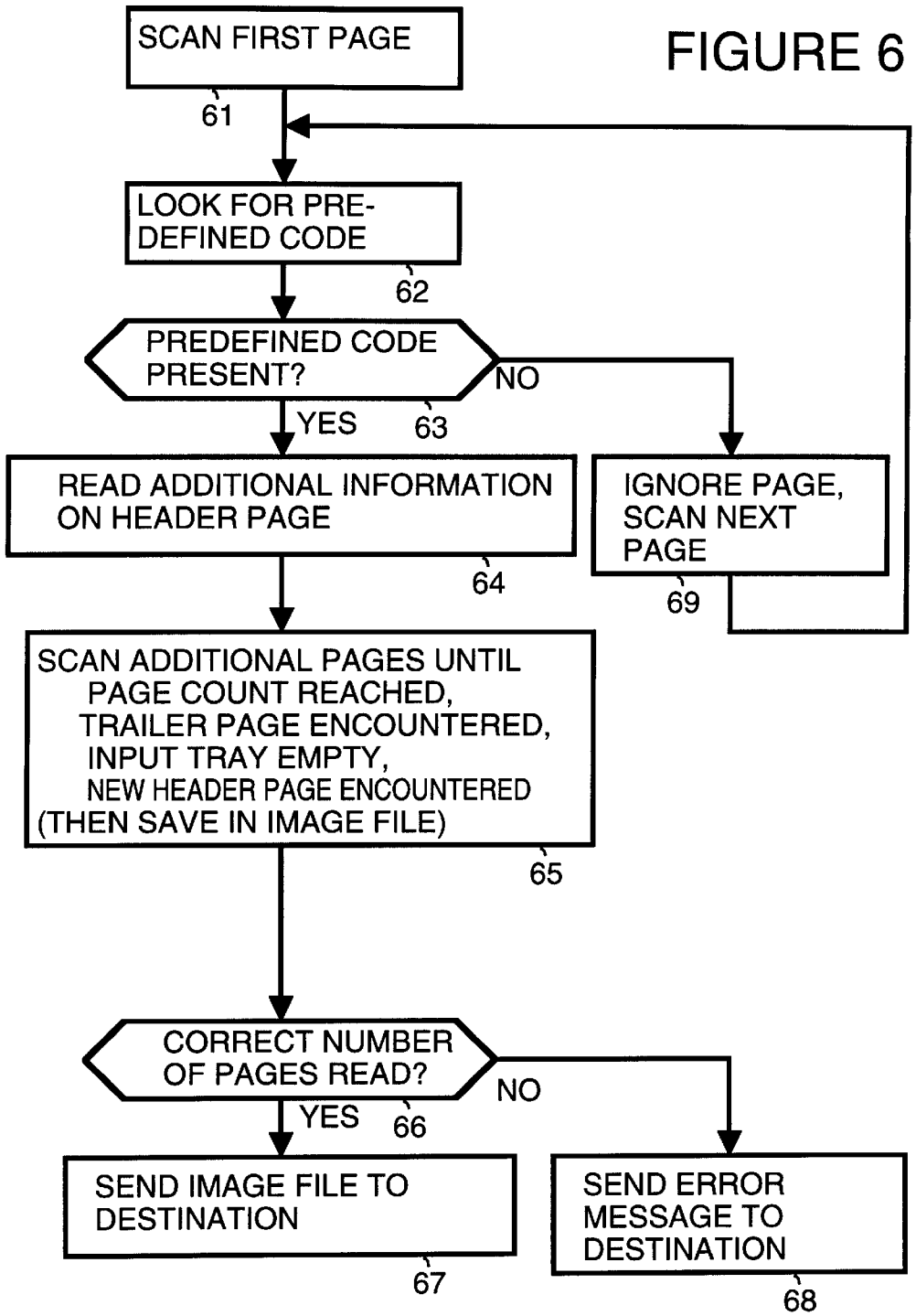
FIG. 6 shows a simplified flowchart which illustrates operation of the functionality of the scanner shown in FIG. 1 and FIG. 2 during a scan when a trailer page is not present in accordance with a preferred embodiment of the present invention.

FIG. 6 is a simplified flowchart which illustrates operation of the functionality of scanner 11 when the header page indicates that there is no trailer page present.

In a step 61, a first page is scanned. The scanner will recognize any header page as the beginning of a new scan job.

In a step 62, scanner 11 looks for the predefined code. This is performed, for example, by optical symbol recognition hardware 14. In a step 63, if the predefined code is not present, in a step 69, the page is ignored and a next page is scanned in. Alternatively, if scanner 11 is also configured to receive scans not set up by a header page, the scanned image may be sent to a default file or to a destination in accordance with instructions sent to scanner 11 via a computer interface connected to scanner 11, in accordance with instructions received through a user interface of scanner 11, or through other methods known in the art.

If in step 63, the predefined code is present, in a step 64, after finding the pre-defined code, optical symbol recognition hardware 14 continues to read the relevant fields of information/commands contained on header page 30 and records the information in memory within scanner 11 for future reference.

In a step 65, additional pages are scanned in. The resulting scanned images are saved in an image file within scanner 11 or on a remote drive. Scanner 11 continues scanning pages until the page count is reached, input tray 13 is emptied, a new header page is encountered, or a trailer page is reached.

In a step 66, makes a check to see whether the scan was stopped because scanner 11 successfully scanned the number of pages that match the page count indicated on header page 30. If not, in a step 68 an error message is sent to the destination indicated on the header page. Alternatively, if an e-mail address is specified, the error message can be sent to the e-mail address. If in a step 66 the correct number of pages have been scanned, in a step 67, the image file is sent to the destination specified on the header page.

Figure 7:
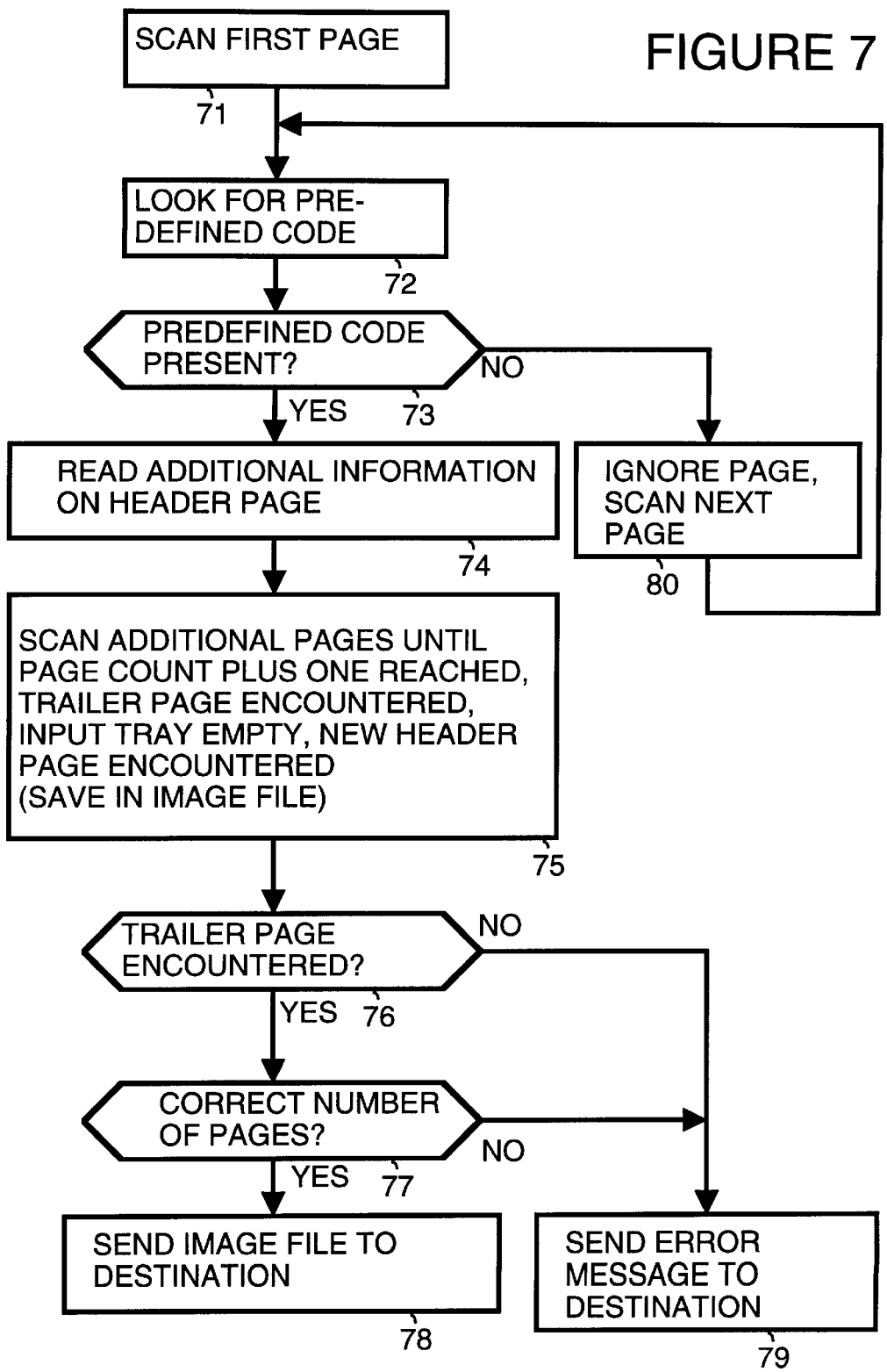
FIG. 7 shows a simplified flowchart which illustrates operation of the functionality of the scanner shown in FIG. 1 and FIG. 2 during a scan when a trailer page is present in accordance with a preferred embodiment of the present invention.

FIG. 7 is a simplified flowchart which illustrates operation of the functionality of scanner 11 when the header page indicates that there is a trailer page present.

In a step 71, a first page is scanned. The scanner will recognize any header page as the beginning of a new scan job.

In a step 72, scanner 11 looks for the predefined code. This is performed, for example, by optical symbol recognition hardware 14. In a step 73, if the predefined code is not present, in a step 80, the page is ignored and a next page is scanned in. Alternatively, if scanner 11 is configured to additionally receive scans not set up by a header page, the scanned image may be sent to a default file or to a destination in accordance with instructions sent to scanner 11 via a computer interface connected to scanner 11, or in accordance with instructions received through a user interface of scanner 11.

If in step 73, the predefined code is present, in a step 74, after finding the pre-defined code, optical symbol recognition hardware 14 continues to read the relevant fields of information/commands contained on header page 30 and records the information in memory within scanner 11 for future reference.

In a step 75, additional pages are scanned in. The resulting scanned images are saved in an image file within scanner 11 or on a remote drive. Scanner 11 continues scanning pages until a trailer page is reached, the page count plus one is reached, input tray 13 is emptied or a new header page is encountered.

In a step 76, makes a check to see whether the scan was stopped because scanner 11 encountered the corresponding trailer page. If not, in a step 79 an error message is sent to the destination indicated on the header page. Alternatively, if an e-mail address is specified, the error message can be sent to the e-mail address.

If in step 76, the scan was stopped because scanner 11 encountered the corresponding trailer page, in a step 77 a check is made to see if the correct number of pages has been scanned. If not, in step 79 an error message is sent to the destination indicated on the header page. Alternatively, if an e-mail address is specified, the error message can be sent to the e-mail address. If in a step 77 the correct number of pages have been scanned, in a step 78, the image file is sent to the destination specified on the header page. At this point, if requested, a notification of scan completed is sent to the user.

When there is no automatic document feeder, the user places the scan header page on a flatbed scanner, allows it to scan, and then manually places each additional page of the scan job onto the scanner. This is much more time consuming and far less convenient than using an automatic document feeder, but the concept of header page containing scan control data still provides a useful value added function.

After the scan job has been processed, the user returns to scanner 11 and retrieves the scan job pages from output tray 12. If instructed to do so on header page 30, scanner 11 alerts the user through an e-mail message that the job is complete.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A scanner comprising:

recognition hardware for scanning and extracting scan control information from a header page of a scan document, wherein the scan control information includes a page count which indicates a number of pages in the document; and, optical scanning hardware for scanning remaining pages of the document into an image file;

wherein the recognition hardware also is for recognizing a trailer page when the scan control information specifies that a trailer page is present, the scanner, upon detecting the trailer page, checking to see if a number of pages scanned for the document corresponds with the page count and if the number of pages scanned for the document does not correspond with the page count, the scanner sending an error message to the destination computing system.

2. A scanner as in claim 1 additionally comprising:

an automatic document feeder.

3. A scanner as in claim 1 wherein the scan control information includes a user name, a file name for the image file and the destination computing system.

4. A scanner as in claim 1 wherein when the scanner determines the number of pages scanned for the document does not correspond with the page count, the scanner does not send the image file to the destination computing system specified by the scan control information.

5. A scanner as in claim 1 wherein the recognition hardware comprises a bar code reader.

6. A scanner as in claim 5 wherein the scan control information includes bar code symbols.

7. A scanner as in claim 1 wherein the scan control information is paired on the header page with text comprehensible by a user.

8. A scanner as in claim 1 additionally comprising:

networking hardware, coupled to the optical scanning hardware, for sending the image file to a destination specified by the scan control information.

9. A scanner as in claim 1 wherein the scanner stops scanning a document upon encountering any of the following:

page count is reached, an input tray is emptied, a new header page is encountered, or a trailer page is reached.

10. A method for scanning a document comprising:

(a) scanning in a header page of the document and extracting scan control information from the header page, wherein the scan control information includes a page count that indicates a number of pages in the document;

(b) scanning remaining pages of the document into an image file, including the following substep:

(b.1) when the scan control information specifies that a trailer page is present, performing the following substeps:

(b.1.1) upon detecting the trailer page, checking to see if a number of pages scanned for the document corresponds with the page count, and (b.1.2) when in substep (b.1.1) the number of pages scanned for the document does not correspond with the page count, generating an error message; and, (c) processing the image file in accordance with instructions embodied in the scan control information.

11. A method as in claim 10 wherein in step (a) the scan control information is extracted using a bar code reader.

12. A method as in claim 10 additionally comprising the following step performed before step (a):

(d) generating the header page using a scanner utility.

13. A method as in claim 12 wherein the scan control information includes bar code symbols.

14. A method as in claim 12 wherein the scan control information is paired with text comprehensible by a user.

15. A method as in claim 10 wherein in step (b) scanning of the document is stopped upon encountering any of the following:

the page count is reached, an input tray is emptied, a new header page is encountered, or the trailer page is reached.

* * * * *